(12) United States Patent
Carofiglio et al.

(10) Patent No.: US 11,038,899 B1
(45) Date of Patent: *Jun. 15, 2021

(54) ACTIVE SPEAKER NAMING AND REQUEST IN ICN-BASED REAL-TIME COMMUNICATION SYSTEMS

(71) Applicant: Cisco Technology, Inc., San Jose, CA (US)

(72) Inventors: Giovanna Carofiglio, Paris (FR); Michele Papalini, Issy les Moulineaux (FR); Jacques Olivier Samain, Paris (FR); Xuan Zeng, Paris (FR); Luca Muscariello, Paris (FR); Carl Nathan Buckles, McKinney, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/014,097

(22) Filed: Sep. 8, 2020

Related U.S. Application Data

(63) Continuation of application No. 16/804,162, filed on Feb. 28, 2020, now Pat. No. 10,880,315.

(51) Int. Cl.
*H04N 7/15* (2006.01)
*H04L 29/06* (2006.01)

(52) U.S. Cl.
CPC ........ *H04L 63/126* (2013.01); *H04L 65/1066* (2013.01); *H04L 69/22* (2013.01); *H04N 7/15* (2013.01)

(58) Field of Classification Search
CPC .................. H04L 29/06; H04N 7/15

USPC ........................................... 348/14.01–14.16
See application file for complete search history.

(56) References Cited

U.S. PATENT DOCUMENTS

| 9,282,133 | B2 | 3/2016 | Tsyganok et al. |
| 9,838,333 | B2 | 12/2017 | Ravindran et al. |
| 2007/0097987 | A1 | 5/2007 | Rey et al. |
| 2012/0008681 | A1 | 1/2012 | Lundin |
| 2013/0060962 | A1 | 3/2013 | Wang et al. |

(Continued)

OTHER PUBLICATIONS

Pentikousis Ed., Kostas, et al. "Information-Centric Networking: Baseline Scenarios." Internet Research Task Force (IRTF), RFC 7476, Mar. 2015, 46 pages; http://www.hjp.at/doc/rfc/rfc7476.html.

(Continued)

*Primary Examiner* — Melur Ramakrishnaiah
(74) *Attorney, Agent, or Firm* — Edell, Shapiro & Finnan, LLC

(57) ABSTRACT

Presented herein are methods for dynamic management of names and of named-based requests for media flows in an Information-Centric Network (ICN)-based real-time communication system. The use of different naming schemes on contribution segments and on distribution segments in such architectures results in an effective low latency and scalable communication model based on the notion of active speakers regardless of the underlying mapping between active speakers and participants controlled by the media bridge. Operations are performed both at client side and at media bridge side to dynamically manage binding of names to speakers, while minimizing overhead and complexity of operations involved by a change of active speaker/quality/layout.

20 Claims, 12 Drawing Sheets

(56) References Cited

U.S. PATENT DOCUMENTS

| | | | |
|---|---|---|---|
| 2013/0063542 | A1 | 3/2013 | Bhat et al. |
| 2014/0177482 | A1 | 6/2014 | Crinon et al. |
| 2014/0372941 | A1 | 12/2014 | Parsons et al. |
| 2015/0058413 | A1* | 2/2015 | Ge .................. H04L 67/141 709/203 |
| 2017/0155870 | A1 | 6/2017 | Zetterlund et al. |
| 2017/0195375 | A1 | 7/2017 | Thubert et al. |
| 2017/0324662 | A1 | 11/2017 | Holmberg |
| 2018/0146160 | A1* | 5/2018 | Kang .................. H04N 7/15 |
| 2018/0159915 | A1 | 6/2018 | Westphal et al. |
| 2018/0227390 | A1 | 8/2018 | Reznik et al. |
| 2018/0241669 | A1 | 8/2018 | Muscariello et al. |
| 2018/0287940 | A1 | 10/2018 | Westphal |
| 2018/0376108 | A1* | 12/2018 | Bright-Thomas .... G06K 9/4628 |
| 2019/0089643 | A1 | 3/2019 | Westphal et al. |
| 2019/0089811 | A1 | 3/2019 | White et al. |
| 2019/0089967 | A1 | 3/2019 | White |
| 2019/0158622 | A1 | 5/2019 | Balakrishnan et al. |
| 2019/0163752 | A1 | 5/2019 | Barlaskar et al. |
| 2019/0327169 | A1 | 10/2019 | Alam et al. |
| 2019/0364078 | A1 | 11/2019 | Thubert et al. |
| 2020/0204605 | A1* | 6/2020 | Papalini .................. H04L 67/32 |

OTHER PUBLICATIONS

Grozev, Boris et al., "Last N: Relevance-Based Selectivity for Forwarding Video in Multimedia Conferences", Proceedings of the 25th ACM Workshop on Network and Operating Systems Support for Digital Audio and Video, Mar. 2015, 6 pages.

Zhang, Liyang et al., "Demo: VR Video Conferencing over Named Data Networks", ICN 2017, Sep. 26-28, 2017, Berlin, Germany, 2 pages.

Jangam, Anil et al., "Realtime Multi-party Video Conferencing Service over Information Centric Network", IEEE International Conference on Multimedia & Expo Workshops (ICMEW), DOI: 10.1109/ICMEW.2015, Jul. 2015, 6 pages.

Chakraborti, Asit et al., "ICN based Scalable Audio-Video Conferencing on Virtualized Service Edge Router (VSER) Platform", ICN'15, Sep. 30-Oct. 2, 2015, San Francisco, CA, 2 pages.

Gusev, Peter et al., "NDN-RTC: Real-time videoconferencing over Named Data Networking", Named Data Networking Technical Report NDN-0033, Revision 1: Jul. 2, 2015, 11 pages.

Zhu, Zhenkai et al., "ACT: Audio Conference Tool Over Named Data Networking", ICN'11, Aug. 19, 2011, Toronto, Ontario, Canada, 6 pages.

Jacobson, Van et al., "VoCCN: Voice-over Content-Centric Networks", ReArch'09, Dec. 1, 2009, Rome, Italy, 6 pages.

Muscariello, L. et al., "Hybrid Information-Centric Networking," draft-muscariello-intarea-hicn-01, Internet Area WG, Dec. 4, 2018, 22 pages.

Muscariello, Luca et al., "Cicn", 5 pages, retrieved from Internet Dec. 2, 2019; https://wiki.fd.io/view/Cicn.

IRTF, "Information-Centric Networking Research Group (ICNRG)", https://trac.ietf.org/trac/irtf/wiki/icnrg, Mar. 3, 2020 5 pages.

fd.io, "HICN", https://wiki.fd.io/index.php?title=HICN&oldid=10422, Feb. 28, 2020, 4 pages.

Named Data Networking, "Named Data Networking (NDN)—A Future Internet Architecture", https://named-data.net/, Mar. 3, 2020, 11 pages.

fd.io, "Cicn", https://wiki.fd.io/view/Cicn, Jan. 30, 2020, 5 pages.

Wei, Jun et al., "Experience with Collaborative Conferencing Applications in Named-Data Networks", The 10th Annual IEEE CCCNC—Multimedia Networking & Services & Applications, Jan. 11, 2013, pp. 241-246.

Ravindran, Ravishankar et al., "Towards Software Defined ICN based Edge-Cloud Services", 2013 IEEE 2nd International Conference on Cloud Networking (CloudNet): Industry-Track Paper, Nov. 11, 2013, pp. 227-235.

Jitsi, "Jitsi.org—develop and deploy full-featured video conferencing," retrieved from https://jitsi.org/, on May 6, 2019, 4 pages.

Github, "jitsi/jitsi-meet-torture," retrieved from https://github.com/jitsi/jitsi-meet-torture/, on May 6, 2019, 3 pages.

Linux Containers, "Linux Containers—Infrastructure for container projects," retrieved from https:/linuxcontainers.org/, May 6, 2019, 2 pages.

Selenium, "Selenium—Web Browser Automation," retrieved from https://docs.seleniumhq.org/, on May 6, 2019, 3 pages.

Carofiglio, et al., "Optimal Multipath Congestion Control and Request Forwarding in Information-Centric Networks," 2013 21st IEEE International Conference on Network Protocols (ICNP), Oct. 2013, 10 pages.

Carofiglio, et al., "Leveraging ICN In-network Control for Loss Detection and Recovery in Wireless Mobile networks," ICN'16, Sep. 2016, 10 pages.

The Linux Foundation, "networking:netem [Wiki]," retrieved from https://wiki.linuxfoundation.org/networking/netem, on May 6, 2019, 7 pages.

Git at Google, "webrtc Git repositories," retrieved from https://webrtc.googlesource.com/, on May 6, 2019, 1 page.

Grozev, et al., "Experimental Evaluation of Simulcast for WebRTC," IEEE Communications Standards Magazine, Jun. 2017, 8 pages.

Ivov, et al., "A Real-time Transport Protocol (RTP) Header Extension for Mixer-to-Client Audio Level Indication," Internet Engineering Task Force (IETF), Request for Comments: 6465, Standards Track, Dec. 2011, 15 pages.

Jacobson, et al., "Networking Named Content," CoNEXT'09, Dec. 2009, 12 pages.

Linux Foundation, "FD.io—Vector Packet Processing—One Terabit Software Router," retrieved from https://fd.io/wp-content/uploads/sites/34/2017/07/FDioVPPwhitepaperJuly2017.pdf, on May 6, 2019, 21 pages.

Mosko, et al., "CCNx Semantics," draft-irtf-icnrg-ccnxsemantics-09, ICNRG, Internet-Draft, Experimental, Jun. 26, 2018, 35 pages.

Ott, et al., "Extended RTP Profile for Real-time Transport Control Protocol (RTCP)-Based Feedback (RTP/AVPF)," Network Working Group, Request for Comments: 4585, Standards Track, Jul. 2006, 51 pages.

Petrangeli, et al., "Dynamic Video Bitrate Adaptation for WebRTC-Based Remote Teaching Applications," 2018 IEEE/IFIP Network Operations and Management Symposium, NOMS 2018, Apr. 2018, 5 pages.

Petrangeli, et al., "Improving Quality and Scalability of WebRTC Video Collaboration Applications," MMSys'18: 9th ACM Multimedia Systems Conference, Jun. 2018, 4 pages.

Rodriguez, et al., "Materialising a new architecture for a distributed MCU in the Cloud," Computer Standards & Interfaces 44, Feb. 2016, 3 pages.

Samain, et al., "Dynamic Adaptive Video Streaming: Towards a Systematic Comparison of ICN and TCP/IP," IEEE Transactions on Multimedia, vol. 19, No. 10, Oct. 2017, 16 pages.

Sardara, et al., "A Transport Layer and Socket API for (h)ICN: Design, Implementation and Performance Analysis," ICN '18, Sep. 2018, 11 pages.

Sasson, "How vidyo.io delivers massive scalability while maintaining reliability and quality through cascading SFUs," Dec. 5, 2017, retrieved from https://vidyo.io/blog/features/vidyo-io-delivers-massive-scalability-maintaining-reliability-quality-cascading-sfus/, 7 pages.

* cited by examiner

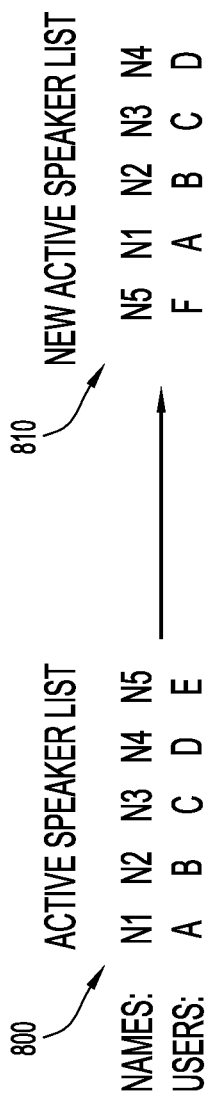
800
NAMES: N1 N2 N3 N4 N5 ← ACTIVE SPEAKER LIST
USERS: A B C D E
810
N5 N1 N2 N3 N4 ← NEW ACTIVE SPEAKER LIST
F A B C D
FIG.8A
NAMES USER HAS TO REQUEST
A: N2 N3 N4 N5
B: N1 N3 N4 N5
C: N1 N2 N4 N5
D: N1 N2 N3 N5
E: N1 N2 N3 N4
FIG.8B
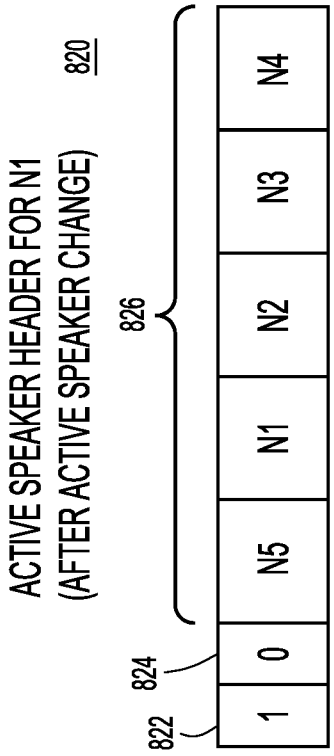
ACTIVE SPEAKER HEADER FOR N1
(AFTER ACTIVE SPEAKER CHANGE)
| 1 | 0 | N5 | N1 | N2 | N3 | N4 |
822  824                826                820
FIG.8C

USER A REQUESTS (AFTER RECEIVING NEW ACTIVE SPEAKER LIST):

USER E REQUESTS:

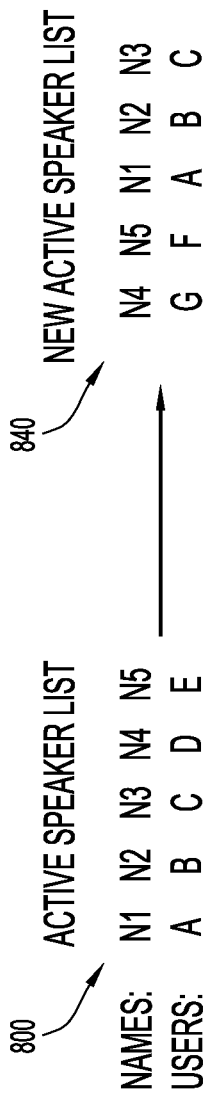

ACTIVE SPEAKER NAMING AND REQUEST IN ICN-BASED REAL-TIME COMMUNICATION SYSTEMS

CROSS REFERENCE TO RELATED APPLICATION

This application is a continuation of U.S. application Ser. No. 16/804,162, filed Feb. 28, 2020, the entirety of which is incorporated herein by reference.

TECHNICAL FIELD

The present disclosure relates secure real-time communications.

BACKGROUND

Real-Time Communications (RTC) architectures today leverage point-to-point transport protocols, such as the Transmission Control Protocol (TCP) or Universal Datagram Protocol (UDP). These transport protocols have no awareness of the multi-point and real-time nature of a RTC application. This may result in inefficient replication of content, long end-to-end retransmissions, overhead due to end-to-end signaling congestion status and other network status information to the application.

BRIEF DESCRIPTION OF THE DRAWINGS

FIGS. 8A-8H are diagrams depicting examples of speaker header changes made by the media bridge and name requests made by participants, according to an example embodiment.

DESCRIPTION OF EXAMPLE EMBODIMENTS

Overview

Figure 1:
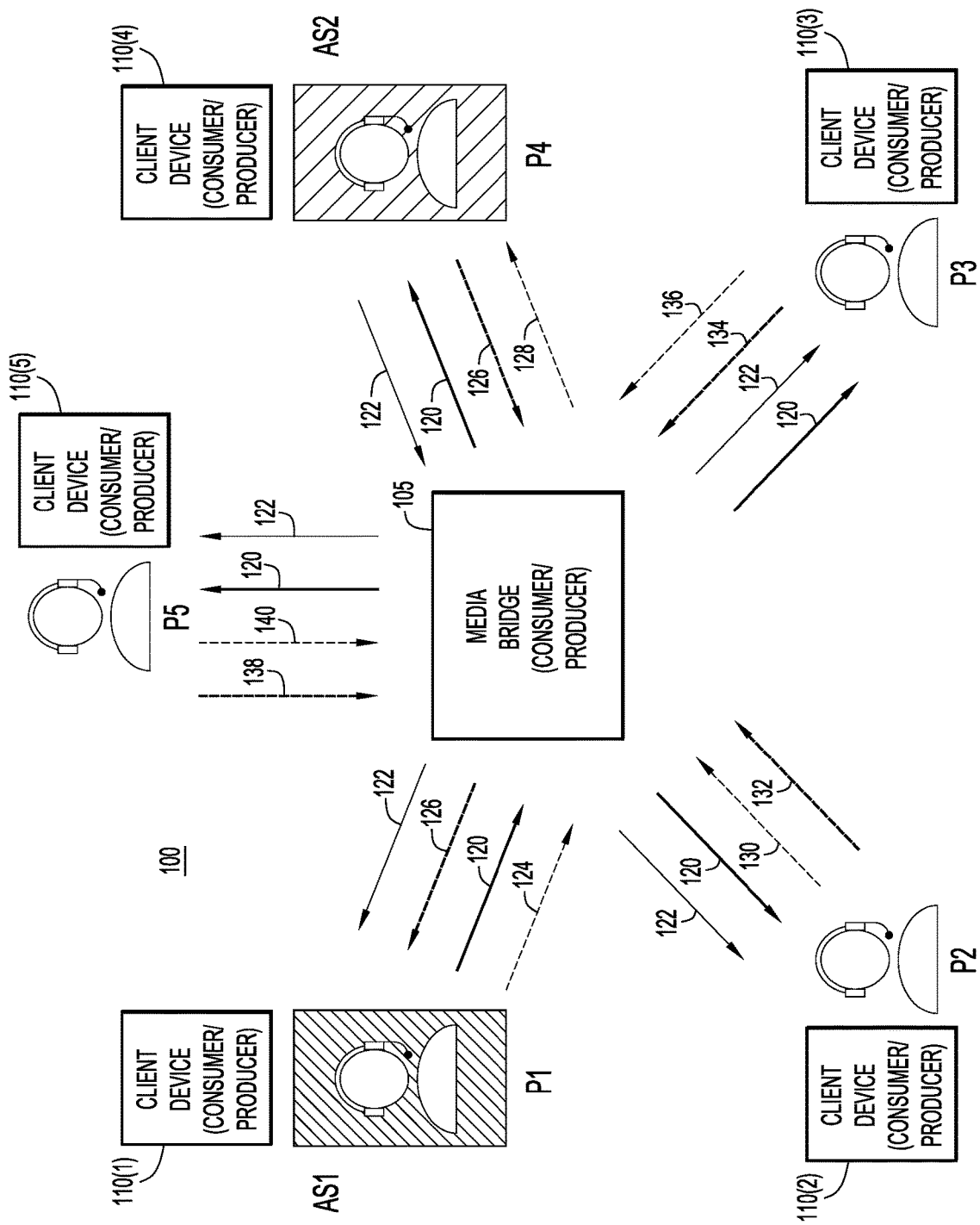
FIG. 1 is a block diagram of a real-time communication system configured to support video communication sessions and using hybrid Information-Centric Networking (hICN) naming techniques, according to an example embodiment.

In one embodiment, a method is provided that is performed by a media bridge or similar device or process. The method includes: obtaining data from a Hybrid Information-Centric Networking (hICN) namespace for a plurality of participants in a video communication session supported by the media bridge; determining whether there is a change in a speaker list, the speaker list being an ordered list of participants at a given sampling interval of the video communication session, each entry in the speaker list corresponding to one of the plurality of participants and being an index that maps to an hICN namespace; when there is a change in the speaker list, updating a speaker header including a first field to indicate when a speaker switch phase is started, a second field to indicate whether a new participant is in the speaker list, a third field containing the speaker list, and a fourth field to identify the new participant when present in the speaker list; and appending the speaker header to hICN packets for distribution to client devices in the video communication session.

In another form, a method is provided that is performed by a video conference client device or process. The method includes: obtaining data from a Hybrid Information-Centric Networking (hICN) namespace for a participant of a plurality of participants in a video communication session supported by a media bridge, the data comprising a media stream consisting of packets that include a speaker header having a speaker list comprising an ordered list of participants at a given sampling interval of the video communication session, each entry in the speaker list corresponding to one of the plurality of participants and being an index that maps to an hICN namespace, the speaker header further including a first field to indicate when a speaker switch phase is started, a second field to indicate whether a new participant is in the speaker list, a third field containing the speaker list, and a fourth field to identify the new participant when present in the speaker list; based on the speaker header, providing into one or more hICN namespaces one or more requests for one or more media streams associated with participants in the speaker list for presentation at a client device associated with the participant; detecting, based on the first field in the speaker header of a packet of the media stream, that there is a change in the speaker list as between a previous speaker list and a current speaker list in the speaker header; and in response to the detecting, and depending on whether the participant is in the current speaker list and in the previous speaker list, updating the one or more requests provided to the hICN namespace.

Example Embodiments

Presented herein are techniques to leverage a named-based approach inspired by Information-Centric Networking to provide an RTC-aware transport and a network-layer naming approach based on RTC participants and active speakers that enables more efficient and scalable media distribution.

Information-Centric Networking (ICN) architectures such as Named-Data Networking (NDN), FD.io Community ICN (CICN), or Hybrid ICN (HICN or hICN) introduce location-independent names at the network layer and use them as communication identifiers in place of host locators for a more efficient, mobility-robust and secure content-based communication.

Beyond the use of a hierarchical structure for efficient aggregation, naming is not specified in ICN Internet Resource Task Force (IRTF) specifications, rather it is left up to the application to decide it on ad-hoc basis given also the underlying constraints specific to the selected ICN design (i.e. fixed or variable size length, encoding in a new proposed header as for NDN or in existing IP headers as for Hybrid ICN).

The encoding of application semantics into network names in ICN architectures is an operation that may have significant implications on security, scalability, mobility, caching and reliability aspects of the resulting ICN-enabled application design. The techniques presented are for naming and requests in ICN-based RTC systems, such as, and without limitation, hICN-RTC for WebRTC applications and WebEx® online meeting applications.

The problem we tackle is that of defining an appropriate ICN naming and dynamic request scheme to address multimedia audio/video flows of active speakers in one or multiple qualities, robust to dynamic change of active speakers, of qualities and of user displayed layout (namely combination of selection of number of active speakers/qualities).

The techniques presented herein may, in one form, employ a Selective Forwarding Unit (SFU) media bridge architecture with the additional benefit that the solution cost scales with the number of active speakers in a video call. This is obtained due to the hICN network architecture that affords three main properties:

1) Maps each media source to a network name (hICN name): each participant's media and the active participant's namespace.
2) Causes the media bridge to pull media from the active speakers instead of letting each participants push media to the media bridge.
3) Causes each participant to pull the active speakers media by pulling data from the active speakers' namespace.

The above three properties are unique to the hICN networking architecture and cannot be reproduced using a simple UDP or TCP socket over Internet Protocol (IP). This allows for reducing the overall traffic significantly because it scales only with the active speakers' traffic and not with traffic generated by all participants. Furthermore, the overall traffic reduction reduces congestion and improves media quality.

hICN uses names and a transport that is connectionless, attached to names, and is pool-based. A receiver sends packet-by-packet requests to obtain the corresponding name data packet back over reverse paths.

hICN-RTC brings two main modifications to existing RTC solutions (such as WebRTC, the WebEx® online meeting service, or other online meeting services now known or hereinafter developed):

1) A name-based communication at a network and a transport layer. That is, hICN-RTC introduces named-sockets both at the client and at the media bridge to identify media flows.
2) A pull-based connectionless transport based on such names. Data packets produced by one client (also denoted herein as a participant) are pulled by the requests of other participants relayed by the media bridge. Flow and congestion control are delegated to the receiver.

Reference is now made to FIG. 1. FIG. 1 illustrates a block diagram of an example system 100, according to an example embodiment. The system 100 includes a media bridge 105 and a plurality of client devices 110(1)-110(5), each associated with a corresponding participant P1-P5. The number of client devices can be greater or fewer than 5. This is only an example. The client device associated with each participant P1 to P5 acts both as a Producer and as a Consumer of media: a Producer for its audio/video (possibly content) and a Consumer for media produced by other participants and distributed by the media bridge 105. The media bridge 105 may be configured to operate as an SFU for distributing media flows without performing transcoding operations. In another form, the media bridge 105 may be configured as a multiplexing control unit (MCU) or hybrid SFU/MCU media bridge.

FIG. 1 also illustrates that the system 100 incorporates hICN capabilities according to the techniques presented herein. The media bridge 105 and client devices 110(1)-110(5) are provided with and configured to operate as a Consumer application and a Producer application. In this sense, these entities are hICN nodes. As referred to herein, an hICN node or ICN node provisioned with a Consumer application requesting content can be referred to as an 'hICN consumer,' 'ICN consumer' or simply 'Consumer' and an hICN node or ICN node provisioned with a Producer application providing the requested content can be referred to as a 'hICN producer,' 'ICN producer,' or simply 'Producer'. Moreover, as shown in FIG. 1, the media bridge 105 and the client devices 110(1)-110(5) are configured to operate as both Consumers and Producers of content.

In accordance with at least one embodiment, a system, such as system 100, can provide a solution for deployment of ICN inside an Internet Protocol (IP) network (not shown in FIG. 1 for simplicity), rather than over IP that preserves all features of ICN communications with at least one difference including mapping content names into IP addresses.

In some embodiments, hICN design principles can be used to map or encode ICN content names into network layer (e.g., IP) addresses while preserving the name-prefix hierarchy. As such, hICN design principles can be used to implicitly transform regular IP routing and forwarding into their name-based counterpart, leveraging IP forwarding available in standard IP-based equipment, while not preventing the addition of ICN forwarding on top of IP forwarding as part of hICN logic provisioned for such equipment.

In at least one embodiment, several name components can be distinguished in a content name including: a routable prefix, a resource identifier, a resource name, and segmentation identifier. These name components can provide a hierarchy for identifying content from a highest level (e.g., the routable prefix) to a lowest level (e.g., the segmentation identifier). A segmentation identifier can be related to the segmentation of content items into Data packets and enforcing the unicity of content names at Data packet granularity.

Consider one illustrative example content name /ABCDE/ctao/wp/hicn/5. In practice, the content name can be encoded in a number of bits, which may be encoded, at least in part, in an IPv4 address (e.g., 32-bits) or IPv6 address (e.g., 128-bits). In this particular example: the routable prefix is /ABCDE, the resource identifier is /ctao/wp, the resource name is /hicn, and the segment identifier is /5. In various embodiments, the hierarchical naming scheme can vary depending on applications, needs, implementations, or the like.

In general, a routable prefix can represent a routable identifier that can be used to find one or multiple resources. The resource identifier can represent the path within which a set of resources are grouped (e.g., a folder name, a directory, etc.). The resource name can represent an identifier of a particular resource within a set (e.g., a specific file in a folder or directory). The segment identifier can be used to identify the resource or parts of the resource. Segmentation of a resource can vary, for example, based on how a producer segments its resources. In some embodiments, the segment identifier can be a sequence number, a time pointer, or a byte offset. In general, components of the content name together can identify the content of interest. The ICN content name can be mapped to IP addresses in different ways.

Naming and Request Scheme

Again, in accordance with the techniques presented herein, each participant may act at the same time as a:

Consumer for other participants' audio and video flows that it requests to the media bridge and that the media bridge itself requests to the producing participants, and Producer for its audio/video flows that the media bridge requests to guarantee distribution to other participants.

The techniques presented herein involve mapping the RTC naming and communication model into hICN, and naming active speakers. There is usually only one active speaker at a given time during a meeting. The solution involves/depends on the number of participants (times) the number of active speakers. Each participant is sending audio and video (AN) to the media bridge 105 and media bridge 105 selects the active speaker and sends the active speaker content to the participants, in the simplest case.

hICN is name-based. Rather than pushing everything to THE media bridge, the application layer is unchanged and instead, the transport layer, which is named-based for hICN, is used to recognize the active speaker and other participants requests the media content for active speaker. This can become complex because the active speaker is not static. A participant, as a user, can request the media bridge 105 to provide a particular active speaker through the encoding of the active speaker name. The term media stream, as used herein, is meant to include audio, video, and other digital content that may be shared or presented during a meeting.

As depicted in FIG. 1, and only as an illustrative example, participant P1 and participant P4 are active speakers, denoted active speaker (AS1) and AS2, respectively. As such, client device 110(1) associated with participant P1, acts as a Producer in generating content (a media stream) 120 to be made available via the media bridge 105. The media bridge 105 acts as a Consumer with respect to the media stream 120 from client device 110(1) of participant P1, and can distribute media stream 120 to other client devices, e.g., client devices 110(2)-110(5). Similarly, client device 110(4) associated with participant P4, acts as a Producer in generating a media stream 122 to be made available to other participants via the media bridge 105. On the other hand, client device 110(1), on behalf of participant P1, acts as a Consumer of the media stream 122 associated with participant P4, and sends a request to the media bridge 105 for media stream 122, as shown at 124. The media bridge 105 is also a Consumer with respect to the media streams 120 and 122 of participants P1 and P4, respectively, and in so doing, requests media content from client devices 110(1) and 110(4), as shown at 126 and 128, respectively. Client device 110(2), on behalf of participant P2, acts as a Consumer and requests media streams for participants P1 and P4 as shown at 130 and 132. Likewise, client device 110(3), on behalf of participant P3, acts as a Consumer and requests media streams for participants P1 and P4, as shown at 134 and 136. Moreover, client device 110(5), on behalf of participant P5, acts as a Consumer and requests media streams for participants P1 and P4, as shown at 138 and 140.

An active speaker list has no limitation, but in most of cases, there are no more than 5 active speakers.

Two naming schemes may be used:

1) Contribution naming. This is naming used on the contribution path (between the participant producing media (acting as an hICN Producer) and the requesting media bridge (acting as an hICN Consumer). This naming identifies media flows produced by a given participant using a participant identifier. The name encoded into an hICN name may take the form of: /meeting_name/Participant_num/media_type/quality/pkt_num.

2) Distribution naming. This is naming used on the distribution path (between the participant requesting media (acting as an hICN Consumer) and the media bridge (acting as an hICN Producer) for the media received by participants recognized as "active speakers"). This naming identifies media flows produced by a given active speaker. The name encoded into an hICN name may take the form of: /meeting_name/AS_num/media_type/quality/pkt_num.

Packet Header for hICN Packets

Figure 2:
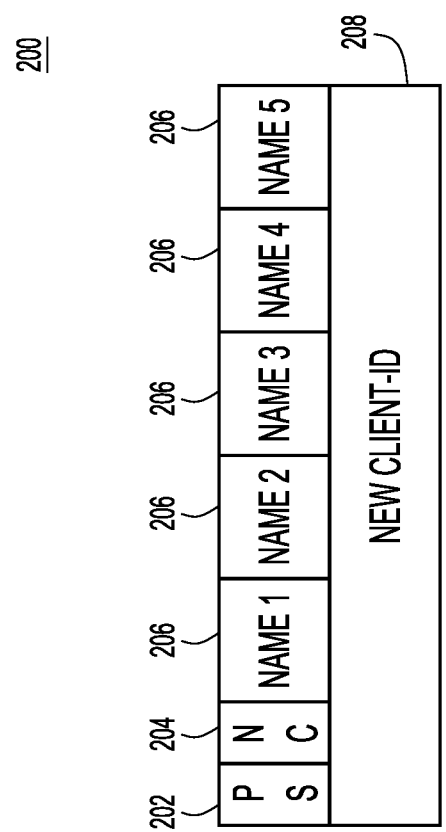
FIG. 2 is a diagram depicting a speaker header that is appended to hICN packets of media streams in a real-time video communication session, according to an example embodiment.

Turning now to FIG. 2, an active speaker header 200 for hICN packets is now described. The active speaker header 200 may be 32 or 64 bits and may be organized as follows.

Positions Switch (PS) field 202: 1 bit. The PS field is set to 1 when an active speaker switching phase is started and is set to 0 when active speaker switching phase is complete. The media bridge may have all the control on the active speaker switching. A switching phase starts when a new active speaker (AS) list is generated and ends when a keyframe (KF) is received for each media flow.

New Client (NC) field 204: 1 bit. The NC field is set to 1 if a new client-identifier (ID) field is present. This may be used when the name will serve a stream coming from a different participant after the active speaker switch.

Active Speaker Name (Name) fields 206: 6 bits. These fields indicate which name (enumerated from 1 to 5, in one example) is used to serve the active speaker N. The order of these fields (from left to right) serve as a mapping of active speaker names and their rank after the active speaker switch. These fields 206 (and their ordering) is managed by the media bridge and sent as an update to participants to handle active speakers switches. The fields 206 are AS numbers, each of which is an index and used to map to an hICN name of a speaker/participant. The fields 206 reflect an active speaker ranking performed at the media bridge.

New Client-ID field 208: 32 bits. This field carries the client (participant) identifier of the flow that will be served under this name. This field exists only if PS=1 and NC=1. If present, the name will be used to serve the content generated by a new participant identified by the Client-ID in this field. In one form, the Client-ID may be a capture source identifier (CSI), for example, in the case of a WebEx online meeting, or SSRC in a WebRTC session.

Figure 3:
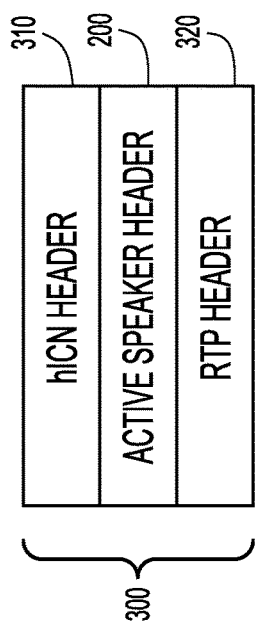
FIG. 3 is a diagram of an hICN packet including the speaker header, hICN header and transport header, according to an example embodiment.

Reference is now made to FIG. 3. FIG. 3 shows an hICN packet 300. The active speaker header 200 is added to each hICN packet 300. The hICN packet 300 may consist of an hICN header 310, the active speaker header 200 and a Real-time Transport Protocol (RTP) header 320.

Figure 4:
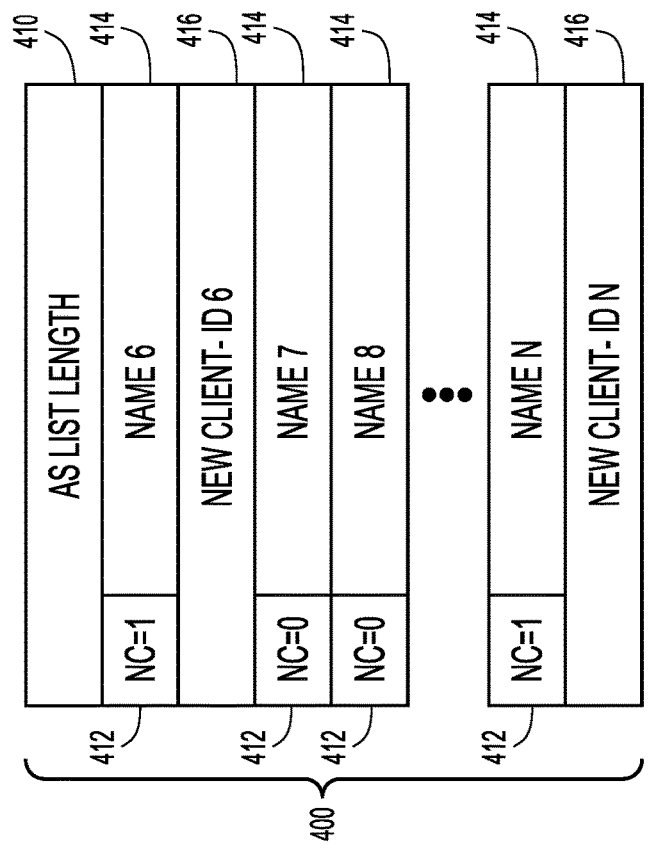
FIG. 4 is a diagram showing an extension of the speaker header of FIG. 2 in order to support any number of speakers in a video communication session, according to an example embodiment.

In the example depicted in FIG. 2, the active speaker header 200 carries information about the first five active speakers. In case of layouts of more than five active speakers, an extension of the additional packet header information may be used. Alternatively, FIG. 4 shows an example of a mechanism to handle a partial or extended AS list, shown at 400. There an AS list length field 410 that indicates the length of the AS list (beyond 5 active speakers), which determines how many additional fields are provided. Following the AS list length field 410, there are additional NC fields 412, name fields 414 and new Client-ID fields 416 (when the associated value of the NC field 412 is 1). For example, the NC field 412 for participant 6 is 1, indicating that is a new participant after an active speaker switch, and the new Client-ID field 416 is populated for participant 6. The same is true for participant N, but not for participants 7 and 8, in the example shown in FIG. 4.

Name Switching at Media Bridge

The media bridge is responsible for identification and ranking of active speakers over time. Numerous algorithms are known in the art for active speaker ranking, and any such algorithms now known or hereinafter developed may be used. The media bridge also performs the mapping between contribution naming and distribution naming in order to match Consumer requests for media flows of a given active speaker with the data produced by the corresponding participant under its participant number identifier. A change of active speaker list may determine a change in the mapping at the media bridge and it may be performed through the operations described below.

Handling Active Speaker Change

To avoid confusion between participant identifiers, active speaker number and rank, the participant's identifier is denoted with a letter (such as P1=A, P2=B, P3=C, P4=D, P5=E, . . . ), and the active speaker number is denoted with a number (1,2,3,4,5, . . . ), active speaker rank is denoted with a roman number (I,II,III,IV,V, . . . ). As previously mentioned, there are two main cases:

1) Full active speaker list is communicated (i.e., case of a maximum of 5 active speakers).

2) Partial active speaker list is communicated (i.e., the requested number of active speakers is greater than the ones in the carried packet header).

Media Bridge Operations

When a change of active speaker ranking occurs, the media bridge encodes into the active speaker header: PS is set to 1 to indicate an active speaker change, the new list of active speakers by ranking, and, if necessary, sets the NC to 1 and encodes the new participant identifier in the related field. This last operation is performed only when the name will be used to produce the content generated by a different/new participant after the active speaker switch.

Upon reception of the first keyframes for the media flows associated to each active speaker in the current ranking, the media bridge performs the switch of flow served under a given active speaker number.

Multiple changes in the active speaker list may be handled simultaneously without requiring the media bridge to handle them in sequence. Also, the notification of flow switch to the participants via the NC=1 indication makes active speaker flow switching robust to losses. If the first packets of the newly switched flow (with an NC=1 indication) are lost, participants continue to request temporary (previous) flows until the reception of the next keyframe (which may be triggered by a retransmission request at the application layer according to the RTC architecture employed).

Figure 5:
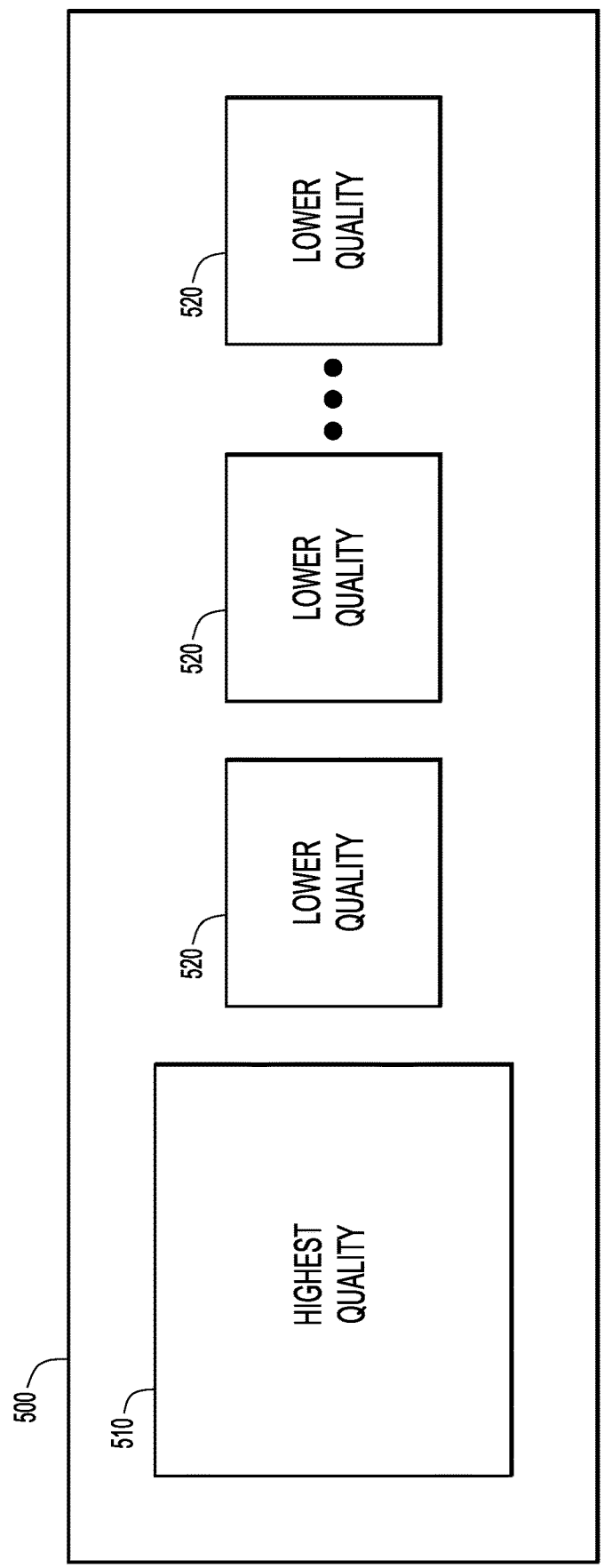
FIG. 5 is a diagram showing a display layout for speakers in a video communication that may employ the hICN naming techniques, according to an example embodiment.

Reference is now made to FIG. 5. FIG. 5 shows an example of at least a portion of display screen 500 on a client device where the video associated with a particular speaker can take on different resolutions. In one example, the highest quality video associated is displayed in the window or section shown at 510. Thus, the window or section 510 may be used for a highest ranking active speaker, highest quality speaker or based on some other ranking criterion/criteria. By contrast, the windows or sections 520 are for lower quality video, and may be used to display video of lower ranking active speakers, lower quality speakers, etc. In a variation, the window or section 510 could be presented above or below a row of windows or sections 520 for lower quality video. There are numerous variations to how to arrange video based on quality to distinguish between ranking of speakers, whether based on active speaker rank or some other criteria. Moreover, client devices may have different display layouts and be different types of devices (e.g. mobile device, laptop, tablet device, video conference endpoint, etc.). Further still, the different resolution/quality layouts may be used independent of active speaker ranking, as described further below.

There are generally three guidelines to help contribute to a more desirable user experience in a video communication session. First, a participant in a video session should not request from the media bridge a video stream of himself/herself. In addition, a participant should not see a freeze in the video from another participant. Finally, the video of a participant should not be presented in a lower quality when it should be presented in a higher quality (e.g., it is video for a highest ranking active speaker).

Figure 6:
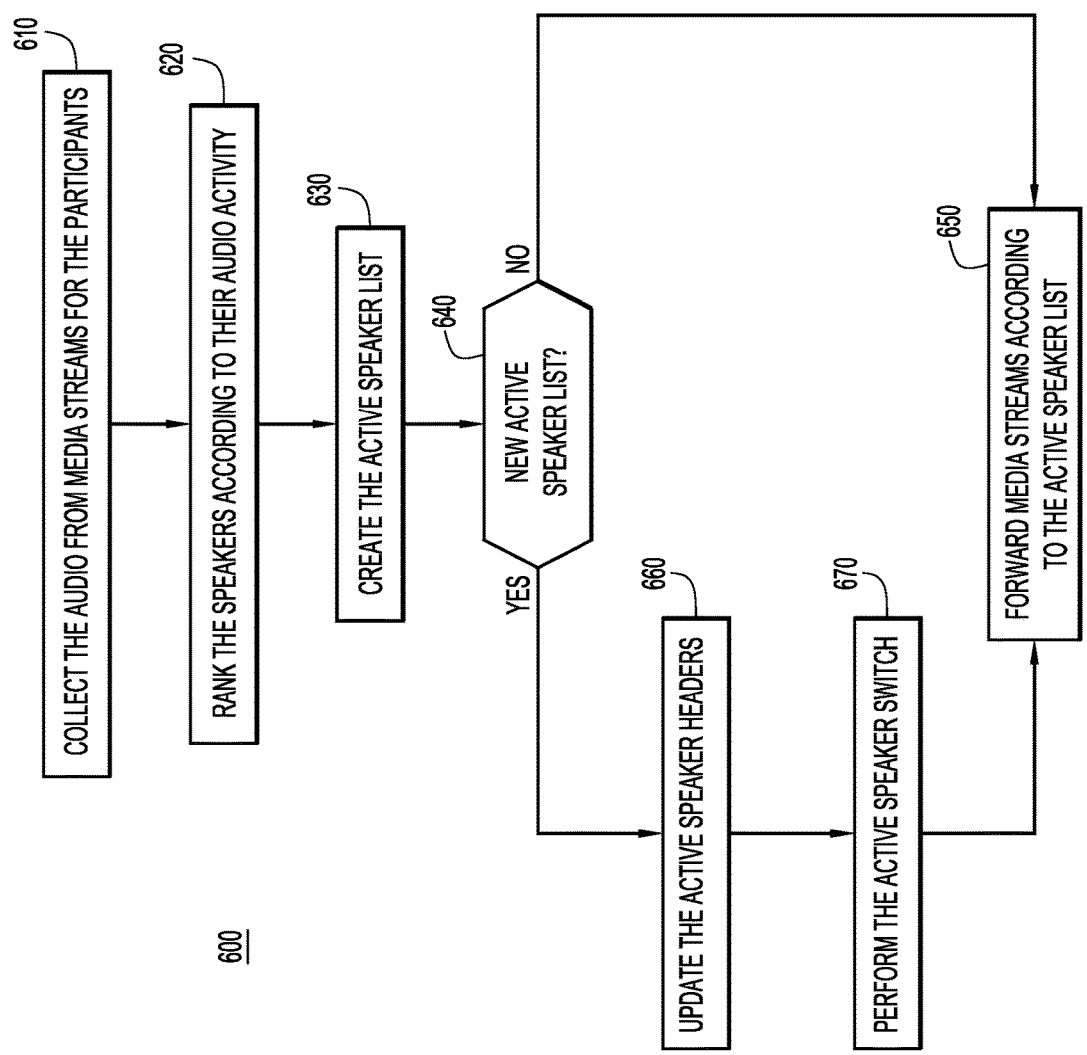
FIG. 6 is a flow chart depicting an active speaker switch detection process performed by a media bridge in a video communication session, according to an example embodiment.

Reference is now to FIG. 6. FIG. 6 shows a flow chart of an active speaker switch detection process 600 that the media bridge performs. The media bridge repeatedly performs the process 600 at successive sampling intervals during a media session among a plurality of participants. At 610, the media bridge collects the audio from the media streams for the participants in a video communication session, such as a web-based or other type of video conference session. At 620, the media bridge ranks the speakers according to their audio (e.g., speech) activity. Numerous techniques are known in the art for speaker ranking. Based on the ranking operation, the media bridge, at 630, creates an active speaker list. At 640, the media bridge determines whether this is a new active speaker list, in other words, whether there is any change in the active speaker list compared to active speaker list at the previous sampling interval. If there is no change in the active speaker list, then at 650, the media bridge forwards the media stream according to the active speaker list. On the other hand, if the media bridge determines at 640 that there is a change in the active speaker list, then at 660, the media bridge updates the headers for the packets associated with the media streams according to an active speaker header update process, described in more detail in connection with FIG. 7. At 670, the media bridge performs the active speaker switch. Then, at 650, the media bridge forwards the media streams according to the active speaker list.

Figure 7:
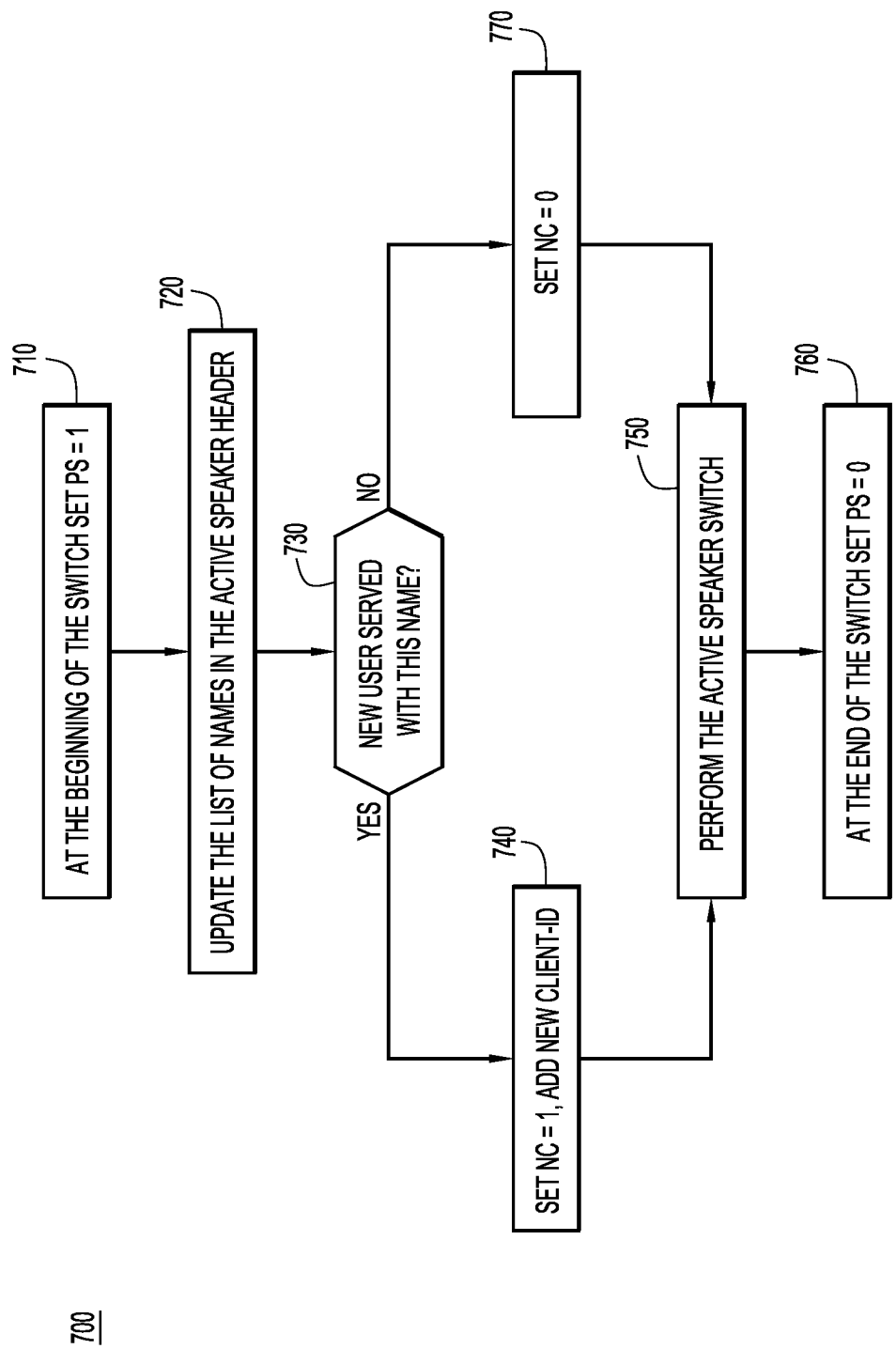
FIG. 7 is a flow chart depicting a speaker header update process performed by the media bridge, according to an example embodiment.

Reference is now made to FIG. 7 for a description of the active speaker header update process 700. Reference is also made to FIGS. 2-4 in connection with the description of FIG. 7. At 710, the media bridge sets the PS indicator to 1 at the beginning of an active speaker switch. At 720, the media bridge updates the list of names in the active speaker header 200. At 730, the media bridge determines whether there is a new user served with a name in the new active speaker list. If the media bridge determines there is a new user served with a name in the new active speaker list, then at 740, the media bridge sets the NC indicator to 1 and adds a new Client-ID for that new user. At 750, the media bridge performs the active speaker switch, and then at 760, at the end of the active speaker switch, the media bridge sets the PS indicator to 0 to indicate the end of the switching phase.

If, at 730, the media bridge determines that there is not a new user served with a name in the active speaker list, then at 770, the media bridge sets the NC indicator to 0, and the process 700 continues to operation 750.

Figure 8D:
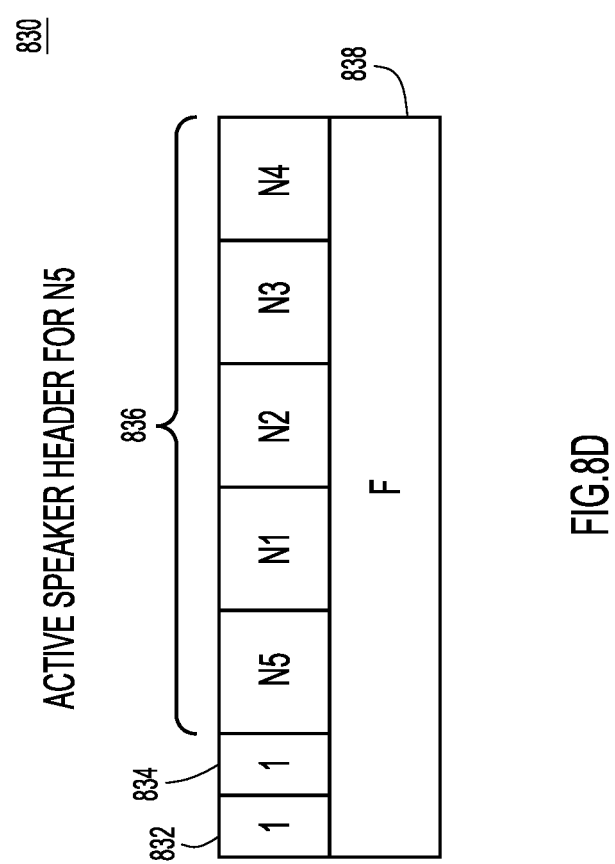

Turning now to FIGS. 8A-8H, examples of the active speaker header update process 700 are now described. FIG. 8A shows that the current active speaker list 800 consists of participants/users A, B, C, D and E. The hICN names assigned to participants A-E are N1-N5, respectively, in this example. At a next sampling interval, the media bridge determines that the new active speaker list 810 is F, A, B, C and D, where speaker F is a new participant/user who was not on the current active speaker list 800, and moreover, speaker F is the highest ranking active speaker. For explanatory purposes, the active speaker list format described herein follows the rule in which the leftmost entry in the active speaker list is highest ranking active speaker (whose video should be displayed in the highest resolution as shown in FIG. 5), and the speakers to the right of the leftmost participant in the active speaker list have progressively lower rank. Thus, in the example of FIG. 8A, participant/user A is the highest ranking active speaker in the current active speaker list 800, and participants B, C, D and E are progressively lower ranked speakers in the current active speaker list 800. In the new active speaker list 810, participant F (who is an entirely new entity in the active speaker list) is the highest ranking active speaker and participants A, B, C and D are progressively lower ranked speakers in the active speaker list 810. It is noted that the name N5 was previously used for participant/user E in the current active speaker list 800, but is used for the participant/user F in the new active speaker list 810 because participant E is not in the new active speaker list 810.

FIG. 8B shows the names that a participant requests, based on the current active speaker list 800 shown in FIG. 8A. Participant A requests the media for the names N2, N3, N4 and N5. Participant B request the media for names N1, N3, N4 and N5, participant C requests the media for names N1, N2, N4 and N5, participant D requests the media for names N1, N2, N3 and N5, and finally participant E requests the media for names N1, N2, N3 and N4. Participants do not request the media for the names associated with themselves.

FIG. 8C shows the active speaker header 820 for the new active speaker list 810 to be inserted onto the media stream that the media bridge generates for the name N1, associated with participant A. The PS field 822 of the active speaker header 820 is set to 1 to indicate a position switch in the active speaker list, the NC field 824 is set to 0, and the name fields 826 are set to N5, N1, N2, N3 and N4, respectively, to indicate names for participants F, A, B, C, and D, respectively. The media bridge inserts the active speaker header 820 onto packets it sends in response to a request for media from name N1. The header that the media bridge inserts onto packets depends on the active speaker state and for which media stream (for which speaker) it is sending media.

FIG. 8D illustrates the active speaker header 830 that the media bridge generates for the media stream for the name N5, in response to the active speaker switch depicted in FIG. 8A. The PS field 832 is set to 1 to indicate that the active speaker switch phase has started. The NC field 834 is set to 1 to indicate that there is a new active speaker in the list of names 836, and the Client-ID for that new active speaker is inserted into the New Client-ID field 838, which in this example, is F.

FIG. 8E illustrates the request that participant A makes for media from the media bridge after receiving the new active speaker list that was sent in an active speaker header 820 shown in FIG. 8C. Whereas previously participant A requested names N2, N3, N4 and N5, prior to the active speaker switch, after the active speaker switch participant A requests the names N5, N2, N3 and N4, corresponding to participants F, B, C and D, respectively. Participant A does not request media of himself/herself from the media bridge.

The media bridge switches the flows on name N5 from participant E to participant F on a keyframe for the media stream for participant F. Participant A waits for a keyframe for media stream from participant F in order to decode and display the new stream from N5 (now user F). There is a period of time after being informed of a speaker switch and before a participant has a keyframe to display the media for that new speaker.

Reference is now made to FIG. 8F. Again, as explained above, the media bridge switches the flows on N5 (from participant E to participant F) on a keyframe of the media stream for participant F. Participant E cannot decode the stream on N5 because it does not have the keyframe for N5 and because N5 had been showing media for participant E, which is itself. As a result, participant E requests N5, N1, N2, N3 and N4. Participant E keeps downloading and displaying media on name N4 (media of another arbitrary participant other than the ones it is requesting, such as participant D) until it receives a keyframe on N5. Participant E can drop the media of N4 (media for participant D) once it receives a keyframe on N5.

FIG. 8G illustrates an example where there is a different type of change in the active speaker list. In this example, the current active speaker list 800 is the same as that shown in FIG. 8A, but the new active speaker list 840 is G, F, A, B and C. Thus, there are two new active speakers F and G, and the highest ranking active speaker is participant G, the next highest ranking speaker is participant F, followed by participants A, B and C.

FIG. 8H illustrates the names participant G requests after the active speaker switch depicted in FIG. 8G. The media bridge switches the flows on N5 (from E to F) on a keyframe, as explained above. Participant G cannot decode the stream on N5 until it has a keyframe for N5. Moreover, participant G cannot display the stream on name N4, otherwise it will see itself after a keyframe. Instead, as shown in FIG. 8H, the participant G requests a temporary channel, called TEMP-N4, from the media bridge. TEMP-N4 is for the media stream that was previously being served on name N4 prior to the active speaker switch, which corresponds to the media for participant D, in this example. Thus, the media bridge produces the same stream on name N4 on this temporary channel even after the switch, to address this situation. In this example, the media bridge provides media for participant D when it receives the name TEMP-N4. The media bridge activates these temporary (TEMP) channels only when needed and stops when the participants are no longer using them. There may be at most one TEMP channel per active speaker switch.

Thus, in summary, the media bridge side operations may include: obtaining data from an hICN namespace for a plurality of participants in a video communication session supported by a media bridge; determining whether there is a change in a speaker list, the speaker list being an ordered list of participants at a given sampling interval of the video communication session, each entry in the speaker list corresponding to one of the plurality of participants and being an index that maps to an hICN namespace; when there is a change in the speaker list, updating a speaker header including a first field to indicate when a speaker switch phase is started, a second field to indicate whether a new participant is in the speaker list, a third field containing the speaker list, and a fourth field to identify the new participant when present in the speaker list; and appending the speaker header to hICN packets for distribution to client devices in the video communication session. The video communication session may be a web-based real-time communication session.

Updating the speaker header when it is determined that there is a change in the speaker list may include: setting at least one bit to a first predetermined value in the first field to indicate that the speaker switch phase has started; updating the third field that contains indices to the speaker list; and determining whether there is a new participant in the speaker list.

When it is determined that there is a new participant in the speaker list, the method may further include: setting at least one bit in the second field to a first predetermined value; and generating the fourth field and adding to the fourth field an identifier associated with the new participant.

The method may further include: switching a flow on an hICN name associated with an index in the third field to a media stream from a previously listed participant to media stream for the new participant on a keyframe for the media stream for the new participant; and generating a temporary media stream to be distributed on an hICN name of a participant in the speaker list prior to starting the speaker switch phase, the temporary media stream allowing a requesting client device to present media in a display layout slot until the keyframe for the media stream for the new participant is received.

When it is determined that there is not a new participant in the speaker list, the method may further include: setting at least one bit in the second field to a second predetermined value.

At a conclusion of the speaker switch phase, the method may further include: setting the at least one bit in the first field to a second predetermined value to signal conclusion of the speaker switch phase.

The method may further include: for packets on a contribution path between a client device associated with one of the plurality of participants, the client device acting as an hICN Producer and the media bridge acting as an hICN Consumer, encoding into an hICN header of the packets, an hICN name that indicates a communication session name, participant number, type of media, resolution quality of media and packet number; and for packets on a distribution path between a client device requesting media acting as an hICN Consumer and the media bridge acting as an hICN Producer, for the media received by participants recognized as active speakers, encoding into an hICN header of the packets, an hICN name that indicates a communication session name, active speaker number, type of media, resolution quality of media and packet number.

The speaker list may be one of: an active speaker list that ranks participants according to an active speaker rank; a quality speaker list that ranks participants according to a display quality rank; and an active speaker/quality list that ranks participants according to a combination of an active speaker rank and a display quality rank.

Client/Participant Side Operations

Figure 9:
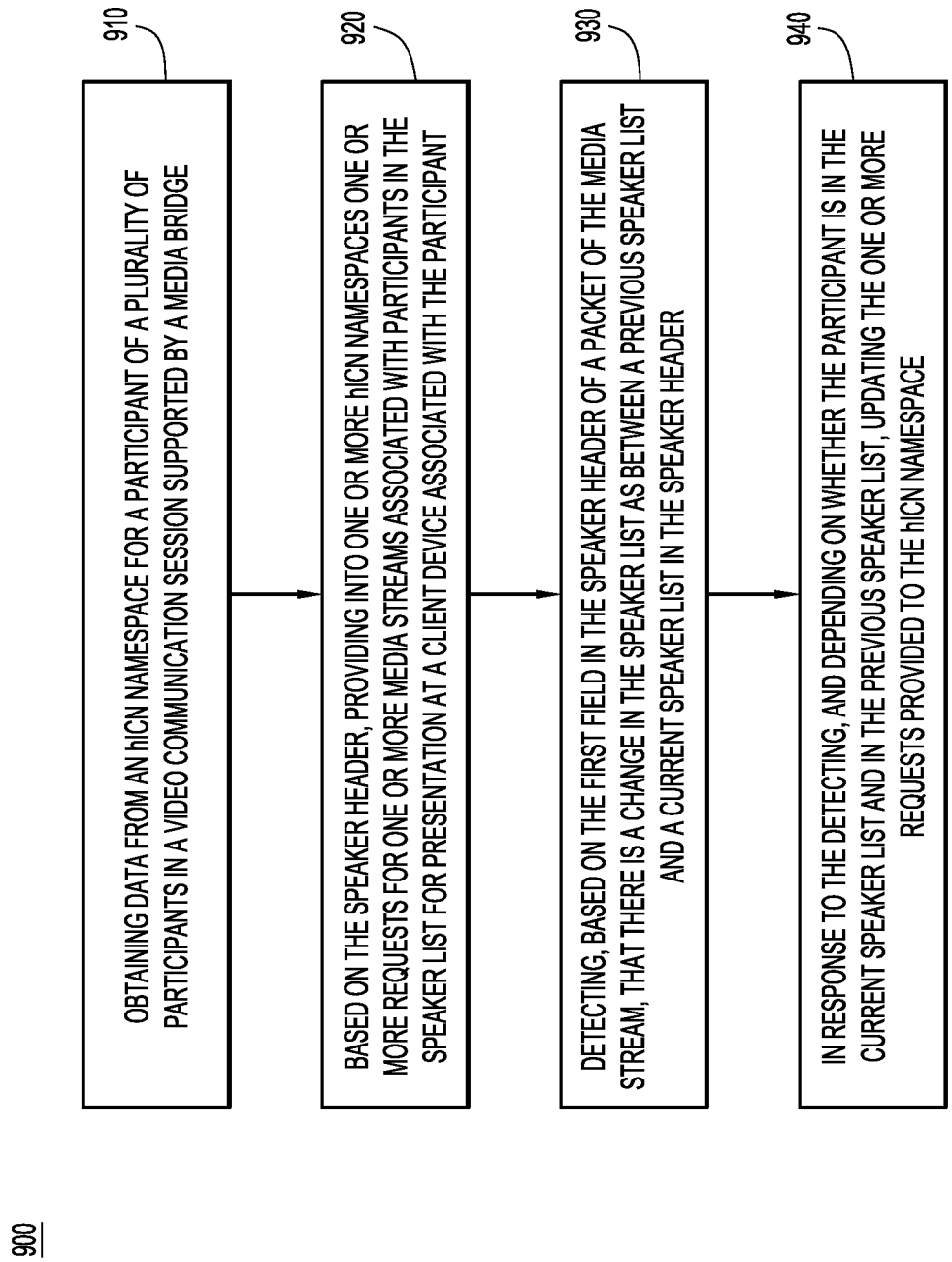
FIG. 9 is a flow chart depicting operations performed by a client device on behalf of a participant in a video communication session, according to an example embodiment.

FIG. 9 illustrates a flow chart depicting a process 900 performed by a client device on behalf of a participant of a video communication session. At 910, the client obtains data/content from an hICN namespace for a participant of a plurality of participants in a video communication session supported by a media bridge. The data comprises a media stream consisting of packets that include a speaker header having a speaker list comprising an ordered list of participants at a given sampling interval of the video communication session. Each entry in the speaker list corresponds to one of the plurality of participants and being an index that maps to an hICN namespace. As depicted in FIG. 2, the speaker header includes a first field to indicate when a speaker switch phase is started, a second field to indicate whether a new participant is in the speaker list, a third field containing the speaker list, and a fourth field to identify the new participant when present in the speaker list. For purposes of generalization, the term "speaker list" is used in connection with FIG. 9 instead of "active speaker list" and is meant to be inclusive of active speaker rank, display quality rank or a combination of active speaker rank and display quality rank, or other possible speaker ranking, as described further below. Thus, the speaker header, more generally, may include a first field to indicate when a speaker switch phase is started, a second field to indicate whether a new participant is in the speaker list, a third field containing the speaker list, and a fourth field to identify the new participant when present in the speaker list.

At 920, based on the speaker header, the client device provides (sends) into one or more hICN namespaces one or more requests for one or more media streams associated with participants in the speaker list for presentation at a client device associated with the participant. In other words, the client device sends a request into each hICN namespace associated with each speaker in the speaker list in the video communication session, and as described below, updates these requests based learning about changes to the speaker list (indicated by changes made to the speaker list by the media bridge) from packets that the media bridge generates for each media stream associated with each participant in the video communication session.

At 930, the client devices detects, based on the first field in the speaker header of a packet of the media stream, that there is a change in the speaker list as between a previous speaker list and a current speaker list in the speaker header. At 940, in response to detecting that there is a change in the speaker list, and depending on whether the participant is in the current speaker list and in the previous speaker list, the client device updates the one or more requests provided to the hICN namespace.

When it is determined that the participant is not in the previous speaker list and not in the current speaker list, the method may further include: not updating the one or more requests provided to the hICN namespace; and changing display of media streams according to the current speaker list.

When it is determined that the participant is both in the previous speaker list and in the current speaker list, the method further including: updating the one or more requests to request media streams for participants except for the participant; for media streams already requested, changing display of media streams according to the current speaker list; and for participants joining or leaving the speaker list, switching media flows for a speaker number in the current speaker list.

When it is determined that the participant is in the current speaker list but not in the previous speaker list, the method further includes: updating comprises temporarily providing requests for media streams named in the previous speaker list and in the current speaker list until obtaining an indication of the new participant in the second field of the speaker header and by presence of a new participant identifier in the fourth field of the speaker header; and upon obtaining the indication of the new participant in the second field of the speaker header, terminating requests for media streams named in the previous speaker list that are not in the current speaker list.

When it is determined that the participant is in the previous speaker list, but not in the current speaker list, the method further includes: updating comprises temporarily providing requests for media streams named in the previous speaker list and in the current speaker list until obtaining an indication of the new participant in the second field of the speaker header and by presence of a new participant identifier in the fourth field of the speaker header; and upon obtaining the indication of the new participant in the second field of the speaker header, terminating requests for media streams named in the previous speaker list that are not in the current speaker list.

Moreover, the method further includes: for packets on a contribution path between a client device associated with one of the plurality of participants, the client device acting as an hICN Producer and the media bridge acting as an hICN Consumer, encoding into an hICN header of the packets, an hICN name that indicates a communication session name, participant number, type of media, resolution quality of media and packet number; and for packets on a distribution path between a client device requesting media acting as an hICN Consumer and the media bridge acting as an hICN Producer, for the media received by participants recognized as active speakers, encoding into an hICN header of the packets, an hICN name that indicates a communication session name, active speaker number, type of media, resolution quality of media and packet number.

In general, there are four cases that can be distinguished to describe the resulting operations at the client/participant side triggered by the reception of the first packet in a media stream with PS=1, that is, the detection of a change in the speaker list. A client device will detect the PS=1 indication from a packet in any of the media streams that it had been receiving as part of the video communication session.

A. First Case. The participant is not in previous active speaker list and is not in the current active speaker list. There is no need to update the set of requests the participant sends to the media bridge. Instead, the client just reorders flows upon reception for a display that reflects the new ranking (e.g., from left to right according to the ranking, or dominant active speaker at center and others ordered from left to right, etc.). In other words, when the client device determines that the participant with which it is associated is not in the previous speaker list and not in the current speaker list, the client device does not update the one or more requests provided to the hICN name space, but does change display of media streams according to the current speaker list.

B. Second Case. The participant is both in the previous active speaker list and in the current active speaker list (of the same or different rank). The client device has to request media for all active speakers except for the participant, as indicated in the communicated active speaker list. For those media streams already requested, the client will apply a change in the displayed layout as in case A above. For the media streams of participants joining/leaving the active speaker list, the client will switch flows behind the same active speaker number as operated by the media bridge. In other words, when the client device determines that the participant with which it is associated is both in the previous speaker list and in the current speaker list, the client device: updates the one or more requests (provided at 920) to request media streams for participants except for the participant; for media streams already requested, changes display of media streams according to the current speaker list; and for participants joining or leaving the speaker list, switches media flows for a speaker number in the current speaker list.

C. Third Case. The participant is in the current active speaker list, but is not in the previous active speaker list. The client device temporarily requests the flow named under the active speaker numbers in the previous active speaker list and current active speaker list, until reception of a switch of flows under a given active speaker number operated by media bridge and acknowledged by NC=1 and by presence of new Client-ID in the active speaker header. At that point in time, the client device stops requests for the previous active speaker numbers not in the current active speaker list. In other words, when the client device determines that the participant to which it is associated is in the current speaker list but not in the previous speaker list, the client device: updates the one or more requests (provided at 920) by temporarily providing requests for media streams named in the previous speaker list and in the current speaker list until it obtains an indication of the new participant in the second field of the speaker header and by presence of the new participant identifier in the fourth field of the speaker header; and upon obtaining the indication of the new participant in the second field of the speaker header, terminates requests for media streams named in the previous speaker list that are not in the current speaker list.

D. Fourth Case. The participant is in the previous active speaker list, but not in the current active speaker list. This is same as case C, where the client relies on the flow switch at the media bridge to stop temporary requests for flows associated to the active speaker number in the previous active speaker list and not in the current speaker list. In other words, when the client device determines that the participant to which it is associated is in the previous speaker list, but not in the current speaker list, the client device: updates the one or more requests (provided at 920) by temporarily providing requests for media streams named in the previous speaker list and in the current speaker list until obtaining an indication of the new participant in the second field of the speaker header and by presence of the new participant identifier in the fourth field of the speaker header; and upon obtaining the indication of the new participant in the second field of the speaker header, terminates requests for media streams named in the previous speaker list that are not in the current speaker list.

Further Examples

There are four requested and displayed active speakers and the following communicated 5 active speaker list rank change (A,B,C,D,E)=(1,2,3,4,5) to (F,G,A,B,C)=(4,5,1,2,3).

Participant P1(=A) keeps requesting active speaker numbers [2,3,4,5], but switches display order from (2,3,4,5) to (4,5,2,3). The same occurs for Participant P2(=B) and Participant P3(=C) which belong, like P1, to case B above. They respectively keep requesting [1,3,4,5] now displayed as (4,5,1,2) and [1,2,4,5], now displayed as (4,5,1,3).

Participants P4(=D) and P5(=E) fall in case D above. Indeed, they temporarily request (1,2,3,4,5) during the switch respectively from 3 to 4 and from 3 to 5, acknowledged by NC=1 and presence of new Client-ID.

Participants P6(=F) and P7(=G) fall in case D above. As such, they temporarily request (1,2,3,4,5) during the switch respectively from 4 to 5 and from 3 to 5, acknowledged by NC=1 and presence of new Client-ID.

Additional participants, Pj, j>7, fall in case A. They keep requesting the same active speaker numbers, regardless of the change of media flows operated under a given AS number by the media bridge.

Extension to the Case of Partially Communicated Speaker List

The additional state introduced in hICN-RTC by the techniques presented herein (see FIG. 5) is designed to minimize the bandwidth cost associated with the number of temporary flows to be requested during an active speaker list change. The trade-off between overhead in hICN-RTC packets and overhead associated with temporary flows requested by active speaker changes can be optimized on a per meeting basis according the population of participants (and associated display layout).

In the embodiments presented herein, the number of active speakers reported in the active speaker header corresponds to the maximum number of active speakers displayed by the majority of participants. In such a setting, there may be participants requesting for more than the communicated active speakers. Signaling of active speaker number and ranking for these additional active speakers may occur out-of-band (e.g., by way of a manifest request).

Change of Active Speaker Implying Quality Change

This operations described above in connection with FIGS. 2-9 may be generalized for multiple qualities (from low quality to high quality) and switching between qualities, as described below. In other words, the aforementioned active speaker list may be more generally considered a speaker list that may be one of: an active speaker list that ranks speaker participants according to an active speaker rank; a quality speaker list that ranks speaker participants according to a display quality rank; and an active speaker/quality list that ranks speaker participants according to a combination of an active speaker rank and a display quality rank.

hICN-RTC may encode quality in the name, such as /meeting_name/AS_num/media_type/quality/pkt_num). Therefore, a change of quality may determine the request of a new name (flow) in a manner similar to that for a change in active speaker rank.

A given layout may associate different qualities to the displayed active speakers (e.g. request for dominant active speaker in high quality, following displayed active speakers in low quality). In this case, for instance, a change of position in the ranking for a given active speaker may trigger a quality switch. The participant then requests both previous quality and current quality temporarily until the first key frame for the newly requested quality is received. Once the key frame is received and the new flow (for the newly requested quality) is displayed instead of the previous one, requests for the previous quality are stopped.

In the case of concurrent active speaker and quality switches, the client may switch flows hierarchically according to the requested quality (from the highest to the lowest), in order to prevent temporary display of lower than expected quality. Consequently, the client waits for the reception of the keyframes on the newly requested highest quality flows to display them, while using previous flows temporarily as a placeholder for lower quality newly requested flows.

Extending the previous example to the case where the dominant active speaker is requested in high quality (H) and the following ones in low quality (L), that would give an initial active speaker list rank equal to be:
(A,b,c,d,e)=(1H,2L,3L,4L,5L) where capital letters identify high quality (H), lower case letters identify the low quality (L).

Considering the same change as explained above (A,b,c,d,e)—(1H,2L,3L,4L,5L) to (F,g,a,b,c)=(4H,5L,1L,2L,3L), the following occurs.

Participant P1(=A) keeps requesting active speakers [2L, 3L, 5L] and temporarily requests both 4L and 4H, until PS=1, NC=1 and the first keyframe of F is received.

The same occurs for Participants P2(=B) and P3(=C), which request temporarily 4L and 4H.

Participant P4(=D) keeps requesting [2L,3L, 5L] plus 1H and 1L, while participant P5(=E) temporarily requests (1H, 1L, 2L, 3L, 4L, 4H, 5L) during the switch to (4H,5L,1L,2L), waiting for the reception of the keyframe of 4H to start the switch:
(1H,2L,3L,4L)→(4H, 4L, 1H, 2L)→(4H, 5L, 1H, 2L) or (4H, 4L, 1L, 2L)→(4H, 5L, 1L, 2L)

Participants P6(=F) and P7(=G) temporarily request (1H, 2L,3L,4L,5L,4H) during the switch respectively from 1H to 5H or 4H respectively, acknowledged by NC=1 and presence of new Client-ID.

Additional participants, Pj, j>7, keep requesting 1H,2L, 3L,4L and in addition request 4H, 1L, 5L to switch 4H→1H before, then 1L→1H and 5L→3L.

Thus, the operations of the media bridge described above in connection with FIGS. 2-8H may be summarized/generalized as follows. The media bridge obtains data (content) from an hICN namespace for a plurality of participants in a video communication session supported by a media bridge. The media bridge determines whether there is a change in a speaker list. The speaker list is an ordered list of participants at a given sampling interval of the video communication session. Each entry in the speaker list corresponding to one of the plurality of participants and being an index that maps to an hICN namespace. When the media bridge determines that there is a change in the speaker list, the media bridge updates a speaker header including a first field to indicate when a speaker switch phase is started, a second field to indicate whether a new participant is in the speaker list, a third field containing the speaker list, and a fourth field to identify the new participant when present in the speaker list. The media bridge appends the speaker header to hICN packets for distribution to client devices in the video communication session.

Figure 10:
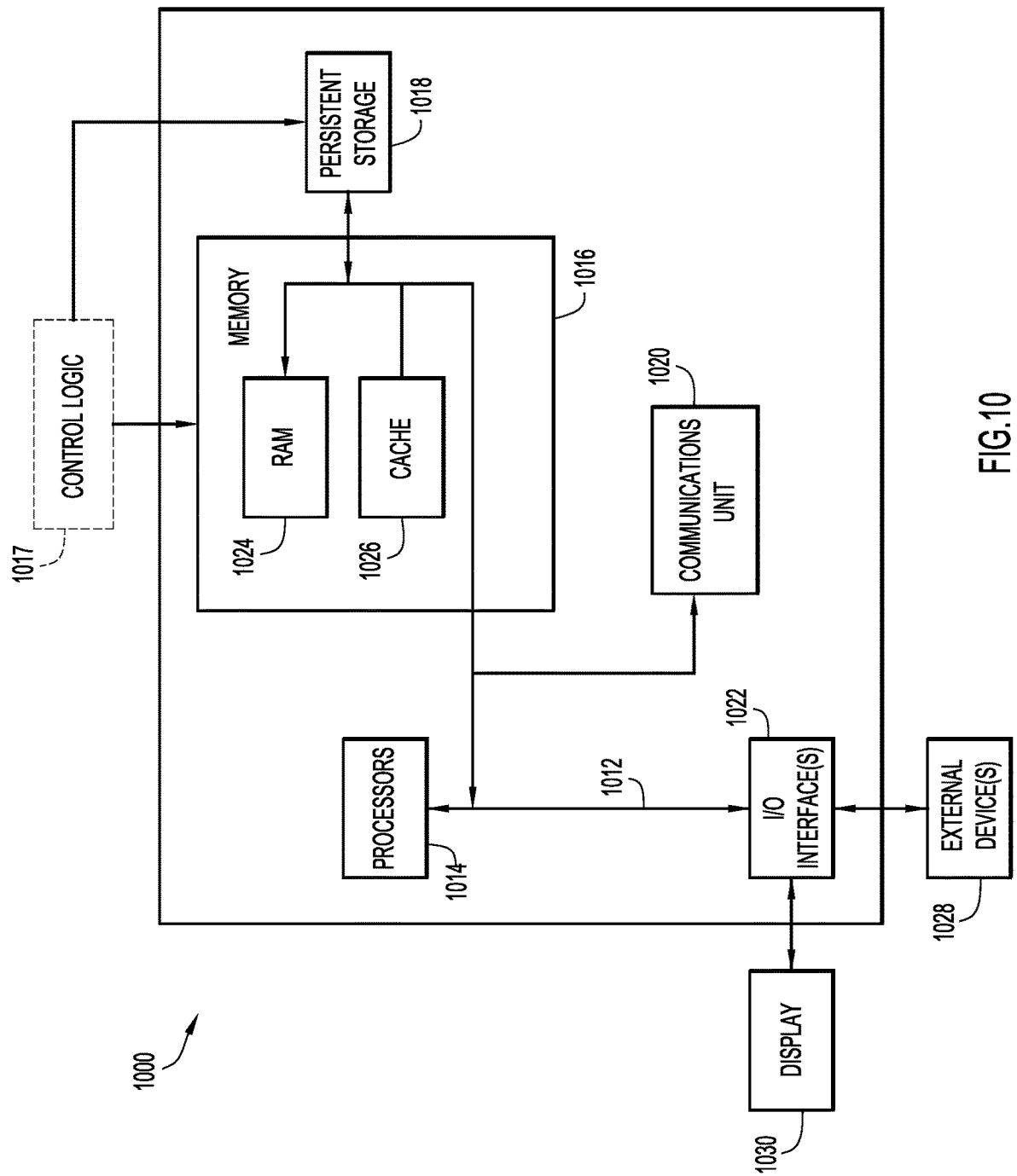
FIG. 10 is a block diagram of a computing device configured to perform the media bridge operations or client device operations presented herein, according to an example embodiment.

FIG. 10 illustrates a hardware block diagram of a computing device 1000 that may perform functions of an hICN node (media bridge 105 or client device 110(i)) operating either as a Consumer or a Producer (or both), as described above in connection with the operations depicted in FIGS. 2-9. It should be appreciated that FIG. 10 provides only an illustration of one embodiment and does not imply any limitations with regard to the environments in which different embodiments may be implemented. Many modifications to the depicted environment may be made.

As depicted, the device 1000 includes a bus 1012, which provides communications between computer processor(s) 1014, memory 1016, persistent storage 1018, communications unit 1020, and input/output (I/O) interface(s) 1022. Bus 1012 can be implemented with any architecture designed for passing data and/or control information between processors (such as microprocessors, communications and network processors, etc.), system memory, peripheral devices, and any other hardware components within a system. For example, bus 1012 can be implemented with one or more buses.

Memory 1016 and persistent storage 1018 are computer readable storage media. In the depicted embodiment, memory 1016 includes random access memory (RAM) 1024 and cache memory 1026. In general, memory 1016 can include any suitable volatile or non-volatile computer readable storage media. Instructions for the control logic 1017 that controls and performs operations of the hICN node, may be stored in memory 1016 or persistent storage 1018 for execution by processor(s) 1014. In one form, the control logic 1017 may take the form of instructions that, when executed by the processor(s) 1014, cause the computing device 1000 to perform media bridge operations described herein (as both a Producer and Consumer). In another form, the control logic 1017 may take the form of instructions that, when executed by the processor(s) 1014, cause the computing device 1000 to perform client device operations described herein (as both a Producer and Consumer).

One or more programs may be stored in persistent storage 1018 for execution by one or more of the respective computer processors 1014 via one or more memories of memory 1016. The persistent storage 1018 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 1018 may also be removable. For example, a removable hard drive may be used for persistent storage 1018. Other examples include optical and magnetic disks, thumb drives, and smart cards that are inserted into a drive for transfer onto another computer readable storage medium that is also part of persistent storage 1018.

Communications unit 1020, in these examples, provides for communications with other data processing systems or devices. In these examples, communications unit 1020 includes one or more network interface cards. Communications unit 1020 may provide communications through the use of either or both physical and wireless communications links.

I/O interface(s) 1022 allows for input and output of data with other devices that may be connected to computer device 1000. For example, I/O interface 1022 may provide a connection to external devices 1028 such as a keyboard, keypad, a touch screen, and/or some other suitable input device. External devices 1028 can also include portable computer readable storage media such as database systems, thumb drives, portable optical or magnetic disks, and memory cards.

Software and data used to practice embodiments can be stored on such portable computer readable storage media and can be loaded onto persistent storage 1018 via I/O interface(s) 1022. I/O interface(s) 1022 may also connect to a display 1030. Display 1030 provides a mechanism to display data to a user and may be, for example, a computer monitor, video display screen or panel or a plurality of display screens, such as is the case for the computing device 1000 serving as a client device.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The embodiments presented herein provide for a method for dynamic management of names and of named-based requests for media flows in an ICN-based real-time communication system. The use of different naming schemes on contribution segments and on distribution segments in such architectures results in an effective low latency and scalable communication model based on the notion of active speakers regardless of the underlying mapping between active speakers and participants controlled by the media bridge. Operations are performed both at client side and at media bridge side to dynamically manage binding of names to speakers, while minimizing overhead and complexity of operations involved by a change of active speaker/quality/layout.

In summary, in one form, a method is provided including: obtaining data from am hICN namespace for a plurality of participants in a video communication session supported by a media bridge; determining whether there is a change in a speaker list, the speaker list being an ordered list of participants at a given sampling interval of the video communication session, each entry in the speaker list corresponding to one of the plurality of participants and being an index that maps to an hICN namespace; when there is a change in the speaker list, updating a speaker header including a first field to indicate when a speaker switch phase is started, a second field to indicate whether a new participant is in the speaker list, a third field containing the speaker list, and a fourth field to identify the new participant when present in the speaker list; and appending the speaker header to hICN packets for distribution to client devices in the video communication session.

In another form, an apparatus is provided including: a communication interface to enable network communications; one or more memories to store data; and one or more processors coupled to the communication interface to perform operations including: obtaining data from a Hybrid Information-Centric Networking (hICN) namespace for a plurality of participants in a video communication session; determining whether there is a change in a speaker list, the speaker list being an ordered list of participants at a given sampling interval of the video communication session, each entry in the speaker list corresponding to one of the plurality of participants and being an index that maps to an hICN namespace; when there is a change in the speaker list, updating a speaker header including a first field to indicate when a speaker switch phase is started, a second field to indicate whether a new participant is in the speaker list, a third field containing the speaker list, and a fourth field to identify the new participant when present in the speaker list; and appending the speaker header to hICN packets for distribution to client devices in the video communication session.

In still another form, one or more non-transitory computer readable media encoded with instructions that, when executed by one or more processors, cause the one or more processors to perform operations including: obtaining data from a Hybrid Information-Centric Networking (hICN) namespace for a plurality of participants in a video communication session supported by a media bridge; determining whether there is a change in a speaker list, the speaker list being an ordered list of participants at a given sampling interval of the video communication session, each entry in the speaker list corresponding to one of the plurality of participants and being an index that maps to an hICN namespace; when there is a change in the speaker list, updating a speaker header including a first field to indicate when a speaker switch phase is started, a second field to indicate whether a new participant is in the speaker list, a third field containing the speaker list, and a fourth field to identify the new participant when present in the speaker list; and appending the speaker header to hICN packets for distribution to client devices in the video communication session.

In still another form, a method is provided comprising: obtaining data from a Hybrid Information-Centric Networking (hICN) namespace for a participant of a plurality of participants in a video communication session supported by a media bridge, the data comprising a media stream consisting of packets that include a speaker header having a speaker list comprising an ordered list of participants at a given sampling interval of the video communication session, each entry in the speaker list corresponding to one of the plurality of participants and being an index that maps to an hICN namespace, the speaker header further including a first field to indicate when a speaker switch phase is started, a second field to indicate whether a new participant is in the speaker list, a third field containing the speaker list, and a fourth field to identify the new participant when present in the speaker list; based on the speaker header, providing into one or more hICN namespaces one or more requests for one or more media streams associated with participants in the speaker list for presentation at a client device associated with the participant; detecting, based on the first field in the speaker header of a packet of the media stream, that there is a change in the speaker list as between a previous speaker list and a current speaker list in the speaker header; and in response to the detecting, and depending on whether the participant is in the current speaker list and in the previous speaker list, updating the one or more requests provided to the hICN namespace.

In another form, an apparatus is provided comprising: a communication interface to enable network communications; one or more memories to store data; and one or more processors coupled to the communication interface to perform operations including: obtaining data from a Hybrid Information-Centric Networking (hICN) namespace for a participant of a plurality of participants in a video communication session supported by a media bridge, the data comprising a media stream consisting of packets that include a speaker header having a speaker list comprising an ordered list of participants at a given sampling interval of the video communication session, each entry in the speaker list corresponding to one of the plurality of participants and being an index that maps to an hICN namespace, the speaker header further including a first field to indicate when a speaker switch phase is started, a second field to indicate whether a new participant is in the speaker list, a third field containing the speaker list, and a fourth field to identify the new participant when present in the speaker list; based on the speaker header, providing into one or more hICN namespaces one or more requests for one or more media streams associated with participants in the speaker list for presentation at a client device associated with the participant; detecting, based on the first field in the speaker header of a packet of the media stream, that there is a change in the speaker list as between a previous speaker list and a current speaker list in the speaker header; and in response to the detecting, and depending on whether the participant is in the current speaker list and in the previous speaker list, updating the one or more requests provided to the hICN namespace.

In still another form, one or more non-transitory computer readable media encoded with instructions that, when executed by one or more processors, cause the one or more processors to perform operations including: obtaining data from a Hybrid Information-Centric Networking (hICN) namespace for a participant of a plurality of participants in a video communication session supported by a media bridge, the data comprising a media stream consisting of packets that include a speaker header having a speaker list comprising an ordered list of participants at a given sampling interval of the video communication session, each entry in the speaker list corresponding to one of the plurality of participants and being an index that maps to an hICN namespace, the speaker header further including a first field to indicate when a speaker switch phase is started, a second field to indicate whether a new participant is in the speaker list, a third field containing the speaker list, and a fourth field to identify the new participant when present in the speaker list; based on the speaker header, providing into one or more hICN namespaces one or more requests for one or more media streams associated with participants in the speaker list for presentation at a client device associated with the participant; detecting, based on the first field in the speaker header of a packet of the media stream, that there is a change in the speaker list as between a previous speaker list and a current speaker list in the speaker header; and in response to the detecting, and depending on whether the participant is in the current speaker list and in the previous speaker list, updating the one or more requests provided to the hICN namespace.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   obtaining data from a Hybrid Information-Centric Networking (hICN) namespace for a plurality of participants in a video communication session supported by a media bridge;
   determining whether there is a change in a speaker list, the speaker list being an ordered list of participants at a given sampling interval of the video communication session, each entry in the speaker list corresponding to one of the plurality of participants and being an index that maps to an hICN namespace; and
   when there is a change in the speaker list, updating a speaker header to indicate when a speaker switch phase is started, whether a new participant is in the speaker list, and to identify the new participant when present in the speaker list.

2. The method of claim 1, wherein updating the speaker header when it is determined that there is a change in the speaker list includes:
   setting at least one bit in the speaker header to a first predetermined value to indicate that the speaker switch phase has started;
   updating in the speaker header, indices to the speaker list; and
   determining whether there is a new participant in the speaker list.

3. The method of claim 2, when it is determined that there is a new participant in the speaker list, the method further including:
   setting at least one bit in the speaker header to a first second predetermined value; and
   including in the speaker header an identifier associated with the new participant.

4. The method of claim 3, further including:
   switching a flow on an hICN name associated with an index in the speaker header to a media stream from a previously listed participant to a media stream for the new participant on a keyframe for the media stream for the new participant; and
   generating a temporary media stream to be distributed on an hICN name of a participant in the speaker list prior to starting the speaker switch phase, the temporary media stream allowing a requesting client device to present media in a display layout slot until the keyframe for the media stream for the new participant is received.

5. The method of claim 2, when it is determined that there is not a new participant in the speaker list, the method further including:
   setting at least one bit in the speaker header to a second predetermined value.

6. The method of claim 2, wherein at a conclusion of the speaker switch phase, the method further including:
setting the at least one bit in the speaker header to a second predetermined value to signal conclusion of the speaker switch phase.

7. The method of claim 1, wherein the video communication session is a web-based real-time communication session.

8. The method of claim 1, further including:
for packets on a contribution path between a client device associated with one of the plurality of participants, the client device acting as an hICN Producer and the media bridge acting as an hICN Consumer, encoding into an hICN header of the packets, an hICN name that indicates a communication session name, participant number, type of media, resolution quality of media and packet number; and
for packets on a distribution path between a client device requesting media acting as an hICN Consumer and the media bridge acting as an hICN Producer, for the media received by participants recognized as active speakers, encoding into an hICN header of the packets, an hICN name that indicates a communication session name, active speaker number, type of media, resolution quality of media and packet number.

9. The method of claim 1, wherein the speaker list is one of: an active speaker list that ranks participants according to an active speaker rank; a quality speaker list that ranks participants according to a display quality rank; and an active speaker/quality list that ranks participants according to a combination of an active speaker rank and a display quality rank.

10. A method comprising:
obtaining data from a Hybrid Information-Centric Networking (hICN) namespace for a participant of a plurality of participants in a video communication session supported by a media bridge, the data comprising a media stream consisting of packets that include a speaker header having a speaker list comprising an ordered list of participants at a given sampling interval of the video communication session, each entry in the speaker list corresponding to one of the plurality of participants and being an index that maps to an hICN namespace, the speaker header indicating when a speaker switch phase is started, whether a new participant is in the speaker list, and identifying the new participant when present in the speaker list; and
based on the speaker header, providing into one or more hICN namespaces one or more requests for one or more media streams associated with participants in the speaker list for presentation at a client device associated with the participant.

11. The method of claim 10, further comprising:
detecting, based on the speaker header of a packet of the media stream, that there is a change in the speaker list as between a previous speaker list and a current speaker list in the speaker header; and
in response to the detecting, and depending on whether the participant is in the current speaker list and in the previous speaker list, updating the one or more requests provided to the hICN namespace.

12. The method of claim 11, wherein when it is determined that the participant is not in the previous speaker list and not in the current speaker list, the method further including:
not updating the one or more requests provided to the hICN namespace; and
changing display of media streams according to the current speaker list.

13. The method of claim 11, wherein when it is determined that the participant is both in the previous speaker list and in the current speaker list, the method further including:
updating the one or more requests to request media streams for participants except for the participant;
for media streams already requested, changing display of media streams according to the current speaker list; and
for participants joining or leaving the speaker list, switching media flows for a speaker number in the current speaker list.

14. The method of claim 11, wherein when it is determined that the participant is in the current speaker list but not in the previous speaker list:
updating comprises temporarily providing requests for media streams named in the previous speaker list and in the current speaker list until obtaining an indication of the new participant in the speaker header and by presence of a new participant identifier in the speaker header; and
upon obtaining the indication of the new participant in the speaker header, the method further including:
terminating requests for media streams named in the previous speaker list that are not in the current speaker list.

15. The method of claim 11, wherein when it is determined that the participant is in the previous speaker list, but not in the current speaker list:
updating comprises temporarily providing requests for media streams named in the previous speaker list and in the current speaker list until obtaining an indication of the new participant in the speaker header and by presence of a new participant identifier in the speaker header; and
upon obtaining the indication of the new participant in the speaker header, the method further including:
terminating requests for media streams named in the previous speaker list that are not in the current speaker list.

16. The method of claim 10, wherein the video communication session is a web-based real-time communication session.

17. The method of claim 10, further including:
for packets on a contribution path between a client device associated with one of the plurality of participants, the client device acting as an hICN Producer and the media bridge acting as an hICN Consumer, encoding into an hICN header of the packets, an hICN name that indicates a communication session name, participant number, type of media, resolution quality of media and packet number; and
for packets on a distribution path between a client device requesting media acting as an hICN Consumer and the media bridge acting as an hICN Producer, for the media received by participants recognized as active speakers, encoding into an hICN header of the packets, an hICN name that indicates a communication session name, active speaker number, type of media, resolution quality of media and packet number.

18. The method of claim 10, wherein the speaker list is one of: an active speaker list that ranks speaker participants according to an active speaker rank; a quality speaker list that ranks speaker participants according to a display quality rank; and an active speaker/quality list that ranks speaker participants according to a combination of an active speaker rank and a display quality rank.

19. An apparatus comprising:

a communication interface to enable network communications;

one or more memories to store data; and one or more processors coupled to the communication interface to perform operations including:

obtaining data from a Hybrid Information-Centric Networking (hICN) namespace for a participant of a plurality of participants in a video communication session supported by a media bridge, the data comprising a media stream consisting of packets that include a speaker header having a speaker list comprising an ordered list of participants at a given sampling interval of the video communication session, each entry in the speaker list corresponding to one of the plurality of participants and being an index that maps to an hICN namespace, the speaker header indicating when a speaker switch phase is started, whether a new participant is in the speaker list, and identifying the new participant when present in the speaker list; and based on the speaker header, providing into one or more hICN namespaces one or more requests for one or more media streams associated with participants in the speaker list for presentation at a client device associated with the participant.

20. The apparatus of claim 19, wherein the one or more processors further perform:

detecting, based on the speaker header of a packet of the media stream, that there is a change in the speaker list as between a previous speaker list and a current speaker list in the speaker header; and in response to the detecting, and depending on whether the participant is in the current speaker list and in the previous speaker list, updating the one or more requests provided to the hICN namespace.

* * * * *

UNITED STATES PATENT AND TRADEMARK OFFICE
CERTIFICATE OF CORRECTION

PATENT NO. : 11,038,899 B1
APPLICATION NO. : 17/014097
DATED : June 15, 2021
INVENTOR(S) : Carofiglio et al.

Page 1 of 1

It is certified that error appears in the above-identified patent and that said Letters Patent is hereby corrected as shown below:

In the Claims

Claim 3, Column 24, Lines 46-47, please replace "to a first second predetermined" with --to a second predetermined--.

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*